United States Patent Office 3,826,848
Patented July 30, 1974

---

3,826,848
PREPARATION OF FUNCTIONAL FISH PROTEIN CONCENTRATES AND ISOLATES
John Spinelli and Barbara Jean Koury, Seattle, Wash., assignors to the United States of America as represented by the Secretary of Commerce
No Drawing. Filed Sept. 14, 1972, Ser. No. 289,040
Int. Cl. A23j 1/04
U.S. Cl. 426—7                10 Claims

ABSTRACT OF THE DISCLOSURE

A slurry of comminuted fish is partially hydrolyzed with a proteolytic enzyme and the modified proteins are recovered as a protein-phosphate complex. The complex is extracted with a polar solvent to remove lipids and then with water to remove the solvent. The extracted complex is neutralized with an alkali and dried. A carbohydrate may be added to the product prior to the drying to improve its storage properties. An enzymically modified myofibrillar protein isolate may be prepared by preliminarily extracting the comminuted fish with a saline solution and then with water.

BACKGROUND OF THE INVENTION

Prior processes for preparing fish protein concentrates (FPC's) include solvent extraction, extraction and precipitation, and chemical or biological hydrolysis of the fish. Depending on the process and the fish species, the prior FPC's are powders or pastes which range from light to dark in color and from bland to intense in flavor. They have high nutritional value and may be used to protein-enrich baked goods such as bread. However they generally lack functional properties such as the ability to emulsify lipids and consequently are not usually incorporated into meat products, beverages or pastries.

In accordance with this invention it has been found that organoleptically stable fish protein concentrates and isolates possessing desirable functional properties may be prepared by enzymically modifying whole fish or the muscle protein fraction and then recovering the modified proteins as protein-phosphate complexes. The complexes preferably are extracted with a polar solvent to remove lipids. The dried products are white to light-colored, are practically tasteless and odorless, moderately soluble in water, and are capable of emulsifying over 200 times their weight of oil.

In the practice of this invention whole or eviscerated fish are comminuted in a grinder or blender and slurried with about 1–5 parts, preferably about 1 part, of water. The pH of the fish slurry should be about 6.0–7.0; if it is less it may be adjusted upward to a maximum of about 8.0–10.0. A proteolytic enzyme of animal or microbiological origin, such as papain, pancreation, bromelin, fiscin, or Rhozyme P–11 is added to the reaction mixture at a ratio, depending on the enzyme activity, of 1 part enzyme to about 25–500 parts protein substrate (dry weight basis). The preferred enzyme:substrate ratio is about 1:50 to 1:200, as it has been found that higher ratios produce excessive amounts of nonprotein nitrogen (NPN) and correspondingly lower protein yields. The reaction mixture is held at about 20–60° C., preferably about 25–30° C., and slowly stirred for about 15–90 minutes, preferably about 30–60 minutes. The partial hydrolysis modifies the fish proteins by splitting them into smaller protein sub-units and into a small amount of potent flavor-producing NPN (various amino acids and peptides). In contrast, a complete hydrolysis would split the protein almost entirely into NPN. It has been found that a high quality organoleptically stable functional FPC is obtained when the NPN content of the reaction mixture is about 4–20%, preferably about 6–10%, of the protein substrate (dry weight basis).

Upon completion of the partial hydrolysis, about 2–10%, preferably about 4–6%, based on the dry weight of the protein, of a linear condensed phosphate in the form of a 5–15%, preferably 10%, solution is added to the reaction mixture. Examples of suitable condensed phosphates are sodium or potassium metaphosphate, trimetaphosphate, hexametaphosphate, or other linear condensed phosphates containing 1–20 phosphate groups in the molecule. The preferred phosphate is sodium hexametaphosphate. The resulting protein-phosphate complexes are precipitated by adding about 0.1 N sulfuric, hydrochloric, phosphoric, lactic, or acetic acids, preferably sulfuric acid, to the reaction mixture in an amount sufficient to lower the pH to about 5.5 and then adding about 1 N similar acid to reduce the pH to about 2.0–5.0, at which values the protein-phosphate complex is completely insoluble (all of the protein is recovered). The pH preferably, however, is reduced to about 2.5–3.5, because it has been found that a pH in this range sufficiently inactivates the proteolytic enzyme to prevent further hydrolysis of the complex during the subsequent extraction and drying steps. Recovery of the partially hydrolyzed proteins according to this invention as a protein-phosphate complex at a pH of about 2.5–3.5 thus (1) obtains 100% of the protein and (2) avoids further hydrolysis during the additional processing. In contrast, recovery of the proteins by precipitation at the isoelectric point of pH 4.0–5.0, for example, recovers a maximum of 90% of the protein, and the unrecoverable protein in solution (10% at pH 4.0–5.0) rapidly increases if the pH is lowered below 4.0 to inactivate the enzyme.

The precipitated acidic complex is separated from the aqueous solution by any suitable separation technique, preferably by centrifugation, and is extracted about 1–5 times, preferably about 2 times, with water to remove excess acid and phosphates. The unneutralized complex is then extracted about 1–5 times, preferably about 3 times, with a polar solvent at about 20–70° C., preferably about 50–60° C., to remove residual lipids. The extracting solvent may be methanol, ethanol, isopropanol, isomers of butanol, or combinations thereof, and preferably is azeotropic isopropanol. The ratio of solvent to wet complex may range from about 1:2 to 2:1, preferably about 1:1, and the residence time of the complex in the solvent may be about 2–30 minutes, preferably about 4–6 minutes. The residual solvent may be removed by drying but preferably is removed (and recovered) by means of about 1–6, preferably about 2–4, aqueous extractions at about 0–60° C., preferably about 15–30° C., using a water:complex ratio of about 1:2 to 2:1, preferably about 1:1. The complex should be extracted while it is in the acidic or unneutralized state, as it has been found that the resulting dried products retain more functionality than products obtained by neutralizing the complex before extraction. For example, a protein-phosphate complex that is precipitated at pH 3.0, extracted wtih isopropanol at 50° C., washed with water, neutralized to 7.0 and spray dried will emulsify about 268 grams of vegetable oil per gram of protein. The same complex, if neutralized to 7.0 before the same alcohol and water treatments and drying, will emulsify only about 172 grams of oil per gram of protein.

The alcohol- and water-washed complex is then neutralized by adding an alkali such as sodium hydroxide, sodium carbonate or bicarbonate, calcium hydroxide, calcium carbonate, or calcium sucrate to the wet complex in an amount sufficient to raise the pH to about 5.0–8.0, preferably about 7.0. To retard the loss during storage of functional properties such as the ability to emulsify lipids, about 5–25%, preferably about 10–20%, of a carbohydrate such as a mono or disaccharide sugar or a degraded starch such as corn syrup solids, Morex, or Maltrin may be added to the neutralized complex. It has been found that complexes containing 15% carbohydrate suffer only a 7% loss of emulsifying capacity after 2 months as compared to a 20% loss with preparations containing no carbohydrate.

The neutralized complex, with or without the carbohydrate additive, is drum, spray, or freeze dried. Freeze-dried samples are about 20% soluble in both water and 5% salt and will emulsify about 220 grams of oil per gram of protein. Spray-dried samples have about 5% less solubility and emulsifying capacity than freeze-dried samples. However, the residual solvent in the spray-dried samples is only about 0.005% (50 parts per million or p.p.m.) as compared to about 0.5% (5,000 p.p.m.) for freeze-dried samples. The Food and Drug Administration currently allows a maximum of 250 p.p.m. alcohol residue in FPC's for human consumption. Desolventizing the present protein-phosphate complexes by water extraction and spray drying thus reduces the residual solvent well below the permissible maximum. In addition this desolventization avoids the denaturing effects of the steam stripping or prolonged vacuum drying usually employed to reduce the solvent in FPC's to an acceptable level.

A myofibrillar protein isolate may be prepared by preliminarily extracting the comminuted fish, preferably eviscerated and freed of skin and bone, for about 10 minutes at about 0–35° C. in 0.1 M saline (sodium chloride). The extracting solution preferably contains about 0.01–0.05%, based on the weight of comminuted fish, of an antioxidant such as propyl gallate, butylated hydroxytoluene, or butylated hydroxyanisole. The solution: fish ratio may range from about 1:1 to 10:1, preferably about 4:1. The solids, consisting mostly of myofibrillar protein, are separated from the sarcoplasmic and lipid fractions by any conventional means, preferably by centrifugation. The solids preferably are resuspended in additional saline solution and recentrifuged. The myofibrillar fraction is then resuspended in tap water at a water:fish ratio of about 1:1 to 4:1, preferably about 2:1, and recentrifuged to further reduce the sarcoplasmic and lipid fractions. The thus prepared myofibrillar protein fraction is then partially hydrolyzed and recovered as a protein-phosphate complex in the manner described above.

The following examples will further illustrate the invention.

EXAMPLE 1

Whole Pacific herring are ground through a food grinder equipped with a ⅛-inch plate and are mixed with an equal part of water. The pH of the slurry if between 6.0–7.0 is unadjusted and Rhozyme P–11 is added to the reaction mixture at a ratio of 1 part enzyme to 150 parts of protein substrate (dry weight basis). The reaction mixture is slowly stirred for 60 minutes at 30° C. Five percent (based on the weight of the dry protein) of sodium hexametaphosphate as a 10% solution is added to the partially hydrolyzed proteins and the pH of the mixture is lowered to 5.5 with 0.1 N $H_2SO_4$ and then to 3.0 with 1 N $H_2SO_4$. The insoluble protein phosphate is collected by centrifugation and washed twice by resuspending in water. Residual lipids are then removed from the complexed proteins by extracting 3 times with azeotropic isopropanol at 50° C. A ratio of 1 part isopropanol to 1 part wet complex is used with a residence time of 5 minutes during each extraction. Residual isopropanol is removed by 4 aqueous extractions at 20° C., using a 1:1 ratio of water to complex. The complex is neutralized to pH 7.0 with sodium hydroxide and spray dried. The composition of the final product is: protein—82%; ash—14%; moisture—4%.

EXAMPLE 2

Eviscerated Pacific Ocean rockfish are freed from skin and bone fractions by the use of a mechanical deboner such as a Bibun or Yanigiya flesh separator or Beehive deboner. The comminuted tissue is added to 0.1 M NaCl containing 0.01% propyl gallate (based on the dry weight of the fish protein). A 4:1 ratio of solution to fish is used and the mixture is held at 30° C. and slowly stirred for 10 minutes. The mixture is centrifuged in a bowl-type centrifuge for 10 minutes to separate the myofibrillar solids from the sarcoplasmic and lipid fractions. The solids are resuspended once in the 0.1 M salt solution and once in tap water, both at a 2:1 ratio of liquid to fish.

The resulting myofibrillar protein is adjusted to 5–10% solids with water and papain is added to the mixture at a ratio of 1 part enzyme to 250 parts protein substrate. Then, as described in Example 1, the mixture is allowed to hydrolyze and the modified proteins are recovered as a protein-phosphate complex and extracted with azeotropic isopropanol and water. The product when neutralized and spray dried has the following composition: protein—90%; ash—6%; moisture—4%.

EXAMPLE 3

Myofibrillar protein is prepared as in Example 2. A 5–10% slurry of the protein is prepared and the pH is adjusted to 9.0 with sodium hydroxide. Rhozyme P–11 is added to the myofibrillar slurry at a ratio of 1 part enzyme to 50 parts myofibrillar protein (dry weight basis). The mixture is allowed to hydrolyze for 30 minutes at 25° C. Five percent sodium hexametaphosphate (based on the dry protein weight) is added (as a 10% solution) to the mixture and the pH is lowered to 3.5 with 1 N sulfuric acid. The precipitated proteins are recovered and treated with alcohol and water as described in Example 1. After neutralization to pH 7.0 with sodium hydroxide, 5% of Maltrin (based on the dry weight of the proteins) is added to the wet protein slurry and the mixture is spray dried. The composition of the dried product is: protein—84.5%; ash—5.8%; moisture—4.7%.

The myofibrillar protein isolates prepared as described in Examples 2 and 3 are about 40% soluble in water and 5% salt solution and will emulsify about 270 grams of vegetable oil per gram of protein. As a comparison, soya isolate and sodium caseinate will emulsify respectively about 230 and 140 grams of oil per gram of protein. Furthermore an emulsion of myofibrillar protein isolate, vegetable oil, and water will break in about 120 minutes, whereas corresponding emulsions of soya isolate and sodium caseinate will break respectively in about 90 and 30 minutes.

We claim:
1. A process for the preparation of functional fish protein concentrates comprising:
partially hydrolyzing a slurry of comminuted fish protein with a proteolytic enzyme and modifying the protein by splitting said protein into a major amount of smaller protein sub-units and a minor amount of flavor-producing nonprotein nitrogen (NPN) in which the hydrolysis is conducted for about 15–90 minutes at about 20–60° C. and the proteolytic enzyme is added to the reaction mixture at a ratio of 1 part enzyme to about 50–200 parts by dry weight of protein; and
separating the protein sub-units from the NPN by complexing the protein sub-units with a linear condensed phosphate of the class consisting of sodium and potassium and having from 1–20 phosphate groups in a molecule; precipitating the resultant protein-phosphate complex at an acid pH of 2.0–5.0 to inactivate the proteolytic enzyme and to prevent further hydrolysis during subsequent processing; separating the precipitated protein-phosphate complex from the NPN; extracting the acidic protein-phosphate complex with a monohydric $C_{1-4}$ alcohol to prevent reversion of functional properties and to remove residual lipids and then with water to remove alcohol; neutralizing the extracted protein-phosphate complex with an alkali; and drying the neutralized protein-phosphate complex.

2. The process of claim 1 in which the hydrolysis is conducted until the NPN is about 4–20% of the protein on a dry weight basis.

3. The process of claim 1 in which the linear condensed phosphate is sodium hexametaphosphate.

4. The process of claim 1 in which the pH at which the protein-phosphate complex is precipitated is about 2.5–3.5.

5. The process of claim 1 in which the extracting of the protein-phosphate complex with alcohol is conducted at about 50–60° C.

6. The process of claim 1 in which the neutralized protein-phosphate complex is spray dried to reduce the residual solvent level below about 250 parts per million.

7. The process of claim 1 including the additional step of adding a carbohydrate to the neutralized protein-phosphate complex before drying to prevent loss of the functional properties of the dried product during storage.

8. The process of claim 1 including the additional preliminary step of extracting the comminuted fish with a saline solution to remove sarcoplasmic and lipid fractions from the myofibrillar solids.

9. The process of claim 8 in which the saline solution contains 0.01–0.05% of an antioxidant based on the dry protein weight.

10. The process of claim 8 including the additional step of extracting the myofibrillar solids with water.

References Cited

UNITED STATES PATENTS

| | | | |
|---|---|---|---|
| 3,598,606 | 8/1971 | Spinelli | 99—18 X |
| 3,561,973 | 2/1971 | Rutman | 99—18 |

A. LOUIS MONACELL, Primary Examiner

R. J. WARDEN, Assistant Examiner

U.S. Cl. X.R.

195—29